Jan. 25, 1927.  
T. MIDGLEY  
1,615,473  
TIRE MOLD AND METHOD OF MAKING THE SAME  
Filed May 27, 1925

INVENTOR.
BY Thomas Midgley
Edward C. Taylor
ATTORNEY.

Patented Jan. 25, 1927.

1,615,473

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD AND METHOD OF MAKING THE SAME.

Application filed May 27, 1925. Serial No. 33,147.

This invention relates to molds particularly adapted for the manufacture of automobile tire casings, and has for one object a mold circumferentially split into two mating halves in which side plates of light material are rigidly associated with tread molding portions of heavier construction. It has for a further object a method of making molds of this type in which the desired results can be attained with a minimum of parts and manufacturing operations. Other and further objects will appear from the description and claims. Certain generic features of the molds here shown are claimed in my copending application Serial No. 33,146, filed concurrently herewith.

Referring to the drawings.

Figure 1:
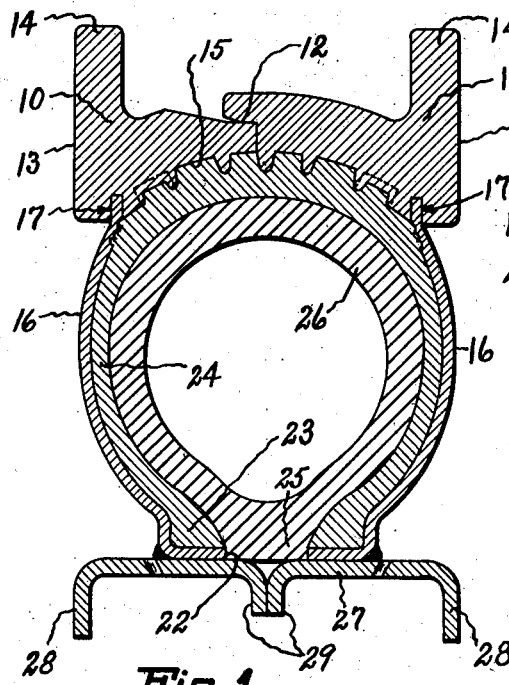
Fig. 1 is a sectional view of one form of mold embodying this invention.
Figure 2:
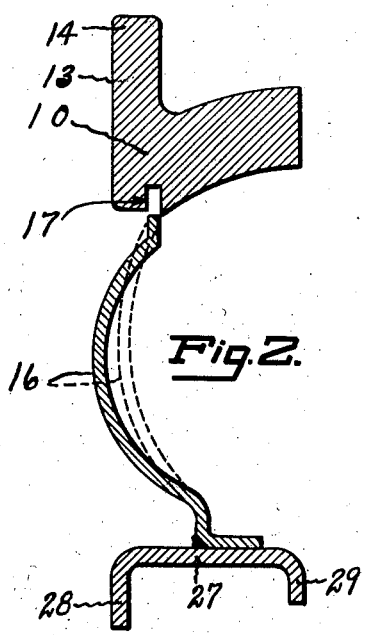
Fig. 2 is a fragmentary section thereof illustrating the method of manufacture.

The mold shown in Figs. 1 and 2 is designed for cases where it is desired to use tread molding portions made of cast metal, but with the side plates of the mold of lighter construction. The tread rings 10 and 11 are formed with registering shouldered portions 12, and with bearing surfaces 13 adapted to receive pressure from adjacent molds or from a press in order to hold the mold closed. These bearing surfaces are preferably extended to form prying flanges 14. A tread pattern 15 may be engraved in the inner surfaces of the tread rings.

The side plates 16 are formed of sheet metal and fit into a circumferential groove 17 in the tread rings. As each tread ring is a solid annulus and the grooves 17 are therefore of a fixed circumference, it is necessary to provide some way of getting the side plates into the groove. In order to make a very solid mold structure with a minimum of parts, the following procedure is adopted according to this modification of the invention. Each side plate is first formed by suitable dies into the form shown in full lines in Fig. 2, the curvature of the plate being made great enough so that its outer periphery lies within the circumference of the opening of groove 17. By other dies the plate is now bent into the dotted line form of Fig. 2, corresponding to the shape shown in Fig. 1, this action causing the outer periphery of the plate to be stretched outwardly into the groove. The rigidity caused merely by forcing the side plates into the groove in this manner is generally sufficient, but if desired the parts may be additionally attached by pinning or welding.

Figure 3:
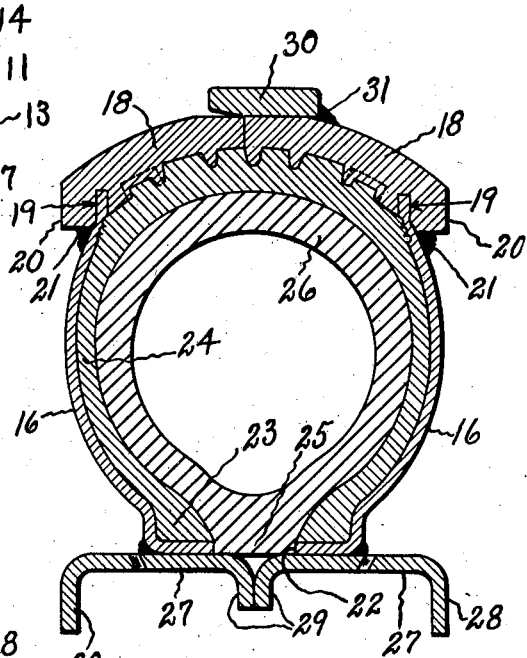
Fig. 3 is a sectional view of a modified form of mold.
Figure 4:
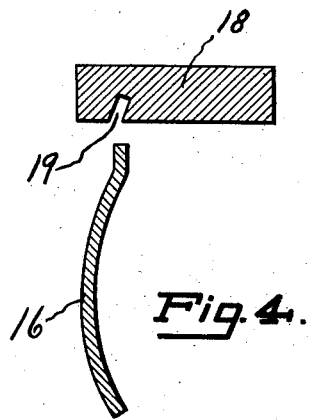
Fig. 4 is a fragmentary section illustrating the method of manufacturing this modified form.

According to the modified procedure shown in Figs. 3 and 4 the tread rings instead of the side plates are subjected to the bending action necessary to cause them to interlock. The tread rings are in this case preferably formed of annular bands of rolled steel 18 into which is cut an angular groove 19. Engraving of the tread pattern is best deferred until the mold has been assembled. The side plates 16 may be formed initially of the shape desired. By suitable dies these tread portions may be bent to the form shown in Fig. 3, causing the grooves 19 to receive the side plates. The surfaces 20 then may be machined parallel to the plane of the mold to provide thrust receiving sides, and the tread design engraved in the interior face of the tread rings. The tread rings and side plates have been shown in this instance as additionally secured together by welding 21.

The inner periphery of the mold has been shown as formed in the manner set forth in my application Serial No. 625,728, filed March 17, 1923. The inner edges 22 of the side plates are bent toward each other so as to underlie the beads 23 of the tire 24. The enlarged inner circumference 25 of the fluid pressure bag 26, used to expand the tire into the mold during vulcanization, is received between the edges 22 of the side plates, being supported by flanged rings 27 welded to the side plates and bridging the gap left between edges 22. Rings 27 have flanges 28 preferably in line with surfaces 20 upon which pressure may be exerted to hold the molds closed, and flanges 29 which may be clipped together to hold the mold halves assembled before it is placed in the vulcanizer. In the modification shown in Figs. 2 and 3 alignment of the mold halves may be accomplished by a ring 30 welded at 31 to one ring 18 and overlying the other.

Changes in the form of the mold and in the arrangement of the several parts may be made without departing from the invention as set forth in the following claims. As one specific example, the rings 27 may be replaced by other devices for coupling the inner peripheries of the mold halves together; for instance, that shown in my copending application Serial No. 622,491 filed Mar. 3, 1923 or that shown in my copending application Serial No. 747,424 filed Nov. 3, 1924. The lettering may be impressed upon the sidewalls before bending, as set forth in my application Serial No. 13,099 filed Mar. 5, 1925. Other changes, and adaptations of other of my inventions as described in various applications, may be made as desired by the mold designer within the scope of the following claims.

Having thus described my invention, I claim:

1. A tire mold having a sidewall portion of substantially uniform thickness curved to the shape of the sides of the tire, and a tread portion of heavier construction, the sidewall portion being permanently received in a circumferential groove formed in an integral part of the tread portion.

2. A tire mold having a sidewall portion of substantially uniform thickness curved to the shape of the side of the tire and a tread portion of heavier construction provided with a circumferential recess in its integral body portion, the sidewall portion being received in said recess and held therein by distortion of one of said portions.

3. A method of making a mold adapted for the vulcanization of tire casings which comprises forming unitary annular tread and side members with interlocking portions, and permanently distorting one of said members to assemble the tread and side members in permanent relation.

4. A method of making a mold adapted for the vulcanization of tire casings from a pair of side plates of sheet material and a pair of annular tread rings, which comprises cutting a circumferential groove in each tread ring and permanently securing a side plate in each tread ring by curving each tread ring and simultaneously causing its groove to receive the side plate.

THOMAS MIDGLEY.